United States Patent [19]

Ichihashi et al.

[11] Patent Number: 5,062,454

[45] Date of Patent: Nov. 5, 1991

[54] SPOOL CONTROL VALVE

[75] Inventors: Koji Ichihashi; Jun-ichi Yasuma, both of Saitama, Japan

[73] Assignee: Diesel Kiki Co. L.T.D., Japan

[21] Appl. No.: 528,063

[22] Filed: May 23, 1990

[30] Foreign Application Priority Data

May 24, 1989 [JP] Japan .................. 1-59119[U]
Sep. 26, 1989 [JP] Japan ................. 1-111708[U]

[51] Int. Cl.[5] .......................................... F15B 13/043
[52] U.S. Cl. ............................ 137/625.61; 137/545; 137/547; 137/550; 137/625.64
[58] Field of Search .......... 137/545, 547, 550, 625.61, 137/625.64; 251/30.01

[56] References Cited

U.S. PATENT DOCUMENTS

| | | | |
|---|---|---|---|
| 2,532,568 | 12/1950 | Myers | 137/547 |
| 2,832,318 | 4/1958 | Paine | 137/625.62 |
| 2,897,792 | 8/1959 | Baltus et al. | 137/625.62 |
| 2,936,783 | 5/1960 | Moffatt | 137/625.62 |
| 2,977,985 | 4/1961 | Ericson et al. | 137/625.61 |
| 3,167,632 | 1/1965 | O'Connor | 137/625.61 X |
| 3,698,437 | 10/1972 | Cox | 137/625.62 |
| 4,763,872 | 8/1988 | Ichihashi et al. | 251/57 X |
| 4,875,501 | 10/1989 | Ichihashi et al. | 137/625.64 |
| 4,922,964 | 5/1990 | Buscher | 137/625.62 |

FOREIGN PATENT DOCUMENTS

| | | | |
|---|---|---|---|
| 110085 | 5/1987 | Japan | 137/625.64 |
| 261782 | 11/1987 | Japan | 137/625.64 |

Primary Examiner—Gerald A. Michalsky
Attorney, Agent, or Firm—Ostrolenk, Faber, Gerb & Soffen

[57] ABSTRACT

A spool control valve in which communicating passages are provided in the spool to communicate between a pair of locations in the spool passage and filter means are provided in a communicating passage to prevent valve orifices being blocked by particles of foreign matter in the fluid.

1 Claim, 5 Drawing Sheets

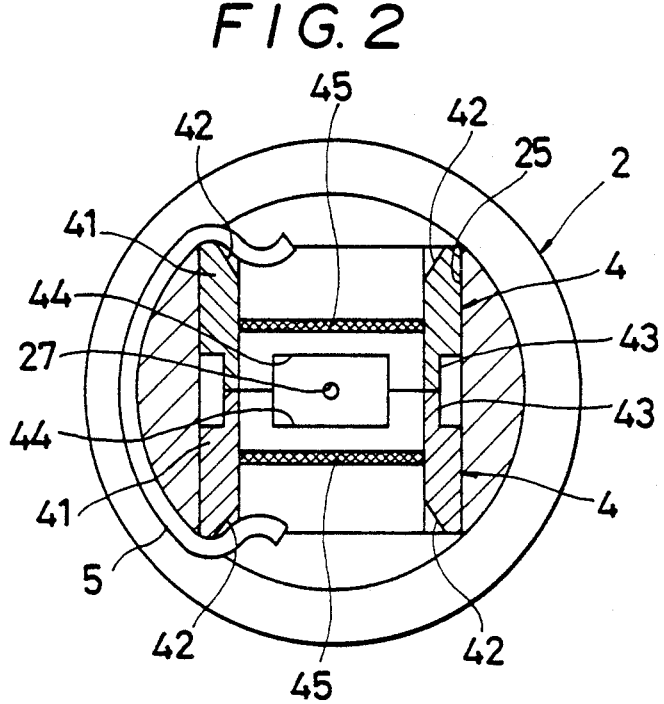
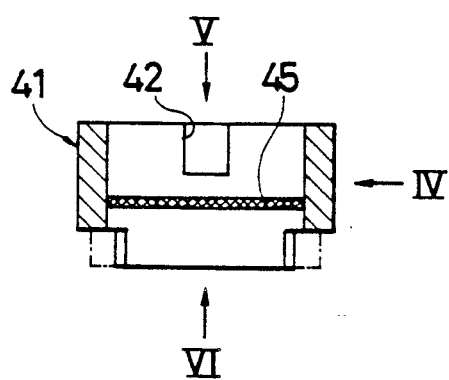
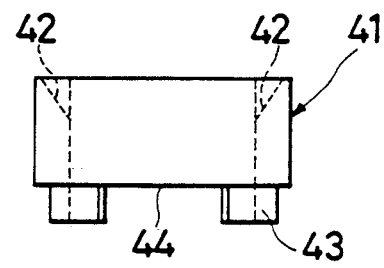
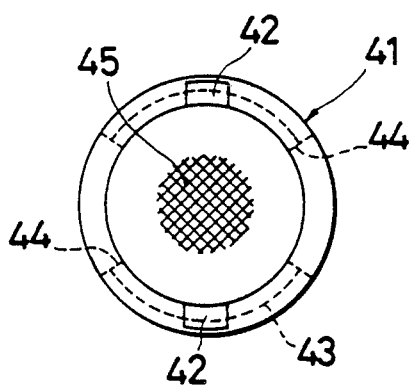
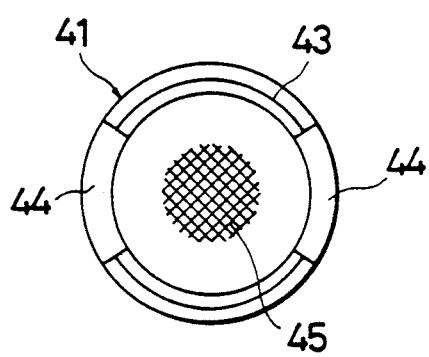

SPOOL CONTROL VALVE

BACKGROUND OF THE INVENTION

1. Field of the Invention

The present invention relates to solenoid proportional pressure control valves and other spool valves in which the pressure in a pilot chamber is varied in accordance with the strength of an electric current applied to the solenoid to thereby control the fluid pressure or flow rate. It particularly relates to a spool valve which prevents internal orifices of the valve from becoming clogged by particles of foreign matter such as dirt and the like and also prevents sticking of the slide caused by particles being caught between the valve housing and the spool.

2. Description of the Prior Art

Spool type control valves such as, for example, solenoid proportional control valves, include the solenoid proportional pressure control valve described in Japanese Unexamined Patent Publication No. 62(1987)-261782. The valve of the disclosure effects pressure control in accordance with the strength of an electrical current flowing in a solenoid. The arrangement of this valve is shown in FIG. 10.

In FIG. 10 a spool B is slidably provided in a spool passage a1 formed in a valve housing A. A horizontal opening b1 is formed in the right-hand end of the spool B to constitute a pilot chamber C. The pilot chamber C communicates with a pump port a2 via an orifice b2 and a large-diameter opening b3, and also communicates with a return port (not shown) via the pilot valve (not shown) of a solenoid.

In the spool control valve such as, for example, a solenoid proportional control valve thus constituted, when the solenoid is energized a pilot valve reduces the area of communication between the pilot chamber C and the return port, producing a rise in pressure in the pilot chamber C. This pressure causes the spool B to be moved to the left against the force of a spring D and brings the pump port a2 and an actuator port a3 into communication, and hydraulic fluid from the pump port a2 flows via the actuator port a3 to an actuator (not shown).

When the actuator port a3 pressure has reached a prescribed level, a hydraulic fluid pressure which is based on the diameter differential between a land b4 and a land b5 causes the spool B to be moved back towards the right. This shuts off communication between the pump port a2 and the actuator port a3, and the pressure in the actuator port a3 is maintained at the prescribed level.

In the solenoid proportional control valve according to this arrangement, the diameter of the orifice b2 is made very small to minimize the effect the flow of hydraulic fluid to the pilot chamber C has on the main flow path from the pump port a2 to the actuator port a3 and to eliminate pressure variations in the pilot chamber C arising from the pumping action of the hydraulic fluid from the pump port a2. In this type of solenoid proportional control valve the orifice b2 therefore quickly becomes blocked, making it impossible for the valve to perform its control function.

An idea of the present inventor was to provide a filter in the opening b3. However, when the opening b3 has a very small diameter, as shown in FIG. 10, filters quickly become clogged and need to be replaced at frequent intervals, making maintenance a problem. Although this could be prevented by making the opening b3 larger, as the opening b3 is situated in the outer wall of the pilot chamber C, increasing the diameter of the opening b3 would mean increasing the area of reduced wall thickness between the opening b3 and the horizontal opening b1, degrading the strength of the spool B.

FIGS. 11 and 12 illustrate another type of conventional spool control valve, which will now be described. Here, the valve is a solenoid proportional control valve 101, which FIG. 11 shows in cross-section, with an enlarged view of the main parts being shown by FIG. 12. With reference to FIG. 11, the solenoid proportional control valve 101 is provided with a valve housing 101, a valve housing 102, a proportional solenoid 103 provided as an integral part of the valve housing 102, and a spool 105 which slides reciprocally in a spool passage 104.

Formed inside the valve housing 102 are a high-pressure delivery port 106, a low-pressure drain port 107, a tank port 108 and a low-pressure drain port 109. Each of the ports 106 to 109 communicates with the spool passage 104. The coil 111 of the solenoid 103 is energized by control signals received via a cable 110, causing an armature 112 to move a prescribed distance to thereby move the spool 105 horizontally. Formed in the spool passage 104 from which they project inwardly are an annular delivery side sliding face 113, a tank side sliding face 114 and a drain side sliding face 115.

The spool 105 is moved by the armature 112 and is returned to its original position by the valve return spring 116. Formed on the peripheral surface of the spool 105 are first and second lands 117 and 118 which slide against the annular delivery side sliding face 113, a land 119 which slides against the tank side sliding face 114 and a land 120 which slides against the drain side sliding face 115.

An annular hydraulic pressure balance groove 121 is formed between the first and second lands 117 and 118. The hydraulic pressure in the hydraulic pressure balance groove 121 exerts a uniform peripheral pressure on the spool 105 to prevent axial deviation of the spool 105. The first and second lands 117 and 118 serve to define a delivery port 106 side high-pressure chamber 122 and a drain port 107 side low-pressure chamber 123, respectively.

As shown by the enlarged view in FIG. 12, a problem with this arrangement is that as a hydraulic pressure differential is used to produce a flow of hydraulic fluid from the high-pressure chamber 122 to the low-pressure chamber 123 (as indicated by the arrow R), particles of foreign matter CT such as dirt and the like get drawn in between the delivery side sliding face 113 and the delivery side second land 118. These particles build up over an extended period and cause the spool 105 to stick in the spool passage 104.

Japanese Unexamined Patent Publication Nos. 61(1986)-201903 and 63(1988)-195477 describe valve mechanisms designed to prevent the movement of the spool being stopped by such particles.

One such arrangement involves boosting the throughput of a proportional solenoid valve by equipping the valve with a stronger return spring 116 or other internal springs to enable the valve to remain functional even if a moderate amount of particles of foreign matter CT enters the valve. However, the drawback with such an arrangement is that it increases the overall size of the valve.

SUMMARY OF THE INVENTION

In consideration of the aforesaid shortcomings of the prior art, an object of the present invention is to provide a spool control valve in which stable function is ensured by preventing dirt and other particles interfering with the operation of the spool.

A further object of the invention is to provide a solenoid proportional control valve or other such spool type control valve arrangement which prevents the valve orifice from becoming blocked without degrading the strength of the valve, thereby also reducing the amount of maintenance required.

A further object of the invention is to provide a spool control valve in which smooth, reliable spool operation is ensured by eliminating a pressure differential in the hydraulic fluid pressure balance groove and preventing contamination of the spool passage by particles of dirt and the like.

The spool control valve according to the present invention comprises forming communicating passages in the spool which communicate between a first location and a second location in the spool passage and providing filter means in the communicating passage.

The above objects are achieved in a spool control valve according to a first embodiment of the invention by forming in the spool through a cross-aperture which has a larger cross-sectional area than that of the valve orifice, extends from the spool periphery facing the pump port in a direction of intersection with the spool axis and is located on the spool axis at a position adjacent to the pilot chamber, forming an orifice between the cross-aperture and the pilot chamber along the spool axis, and providing a filter means in the cross-aperture to remove particles of foreign matter entrained in the hydraulic fluid flowing into the orifice.

A spool control valve according to a second embodiment of the invention comprises a valve housing with a high-pressure port and a low-pressure port, lands that define a high-pressure chamber and a low-pressure chamber and a spool which slides inside the valve housing, wherein a hydraulic pressure balance groove formed in the lands communicates with the high-pressure chamber via a communicating passage and a filter is disposed in the communicating passage.

With the spool control valve arrangement according to this invention, the filter provided in the spool prevents particles of foreign matter entrained in the hydraulic fluid from finding their way into the spool passage and clogging the orifice.

In the spool control valve of the first embodiment, hydraulic fluid enters from the pump port and flows through the orifice and into the cross-aperture. In the course of this process, the filter provided in the cross-aperture removes particles of foreign matter from the fluid, preventing the orifice from becoming blocked. Also, since the cross-aperture is provided at a point on the spool axis that is adjacent to the pilot chamber, the diameter of the cross-opening can be increased without reducing the thickness of the outer wall of the pilot chamber and without, therefore, degrading the strength of the spool. Moreover, the ability to increase the diameter of the cross-opening makes it possible to use a larger filter which will not have to be cleaned or replaced so often.

In the spool control valve of the second embodiment, hydraulic fluid delivered under high pressure via a high-pressure delivery port, for example, passes through the filter and into a hydraulic pressure balance groove whereby the pressure between the high-pressure port and the hydraulic pressure balance groove is equalized. Achieving this pressure equilibrium halts the flow of fluid therebetween, an arrangement which enhances the contamination-resistance of the valve by preventing particles of foreign matter from entering the balance groove. In addition, the introduction of high pressure into the hydraulic pressure balance groove enhances the original function of the groove, which is to prevent axial deviation by applying a uniform peripheral pressure, providing the valve spool with good slidability.

The above and other features of the present invention will become apparent from the following description made with reference to the drawings.

BRIEF DESCRIPTION OF THE DRAWINGS

FIG. 2 is an enlarged sectional view along line II—II of FIG. 1;

FIG. 3 is an enlarged sectional view of the filter;

FIGS. 4, 5 and 6 are views of FIG. 3 as seen from the directions indicated by the arrows IV, V and VI respectively;

DESCRIPTION OF THE PREFERRED EMBODIMENTS

Figure 1:
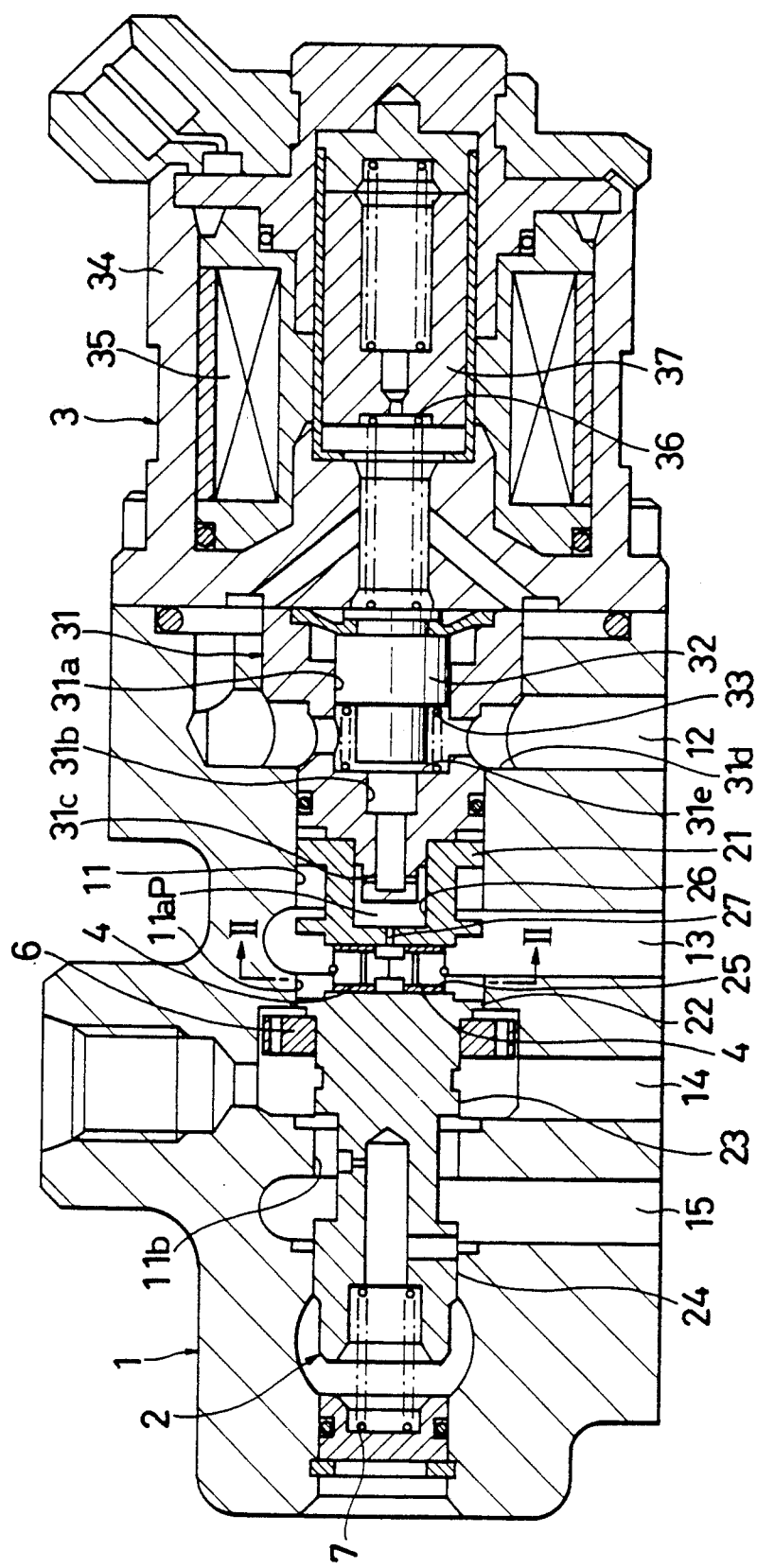
FIG. 1 is a sectional view of the spool control valve according to a first embodiment of the present invention.

The invention will now be described with reference to FIGS. 1 to 6. FIG. 1 is a sectional view of a solenoid proportional pressure control valve according to the present invention. With reference to the drawing, the solenoid proportional pressure control valve is provided with a valve housing 1, spool 2 and pilot valve 3.

Formed in the valve housing 1 are a large-diameter passage portion 11a which is shown on the right side of the housing 1 in FIG. 1, and a small-diameter passage portion 11b which is shown on the left side of the housing 1. Also provided in the following order starting from the right are a return port 12 connected to a hydraulic fluid tank (not shown), a pump port 13 via which hydraulic fluid is delivered by a hydraulic pump (not shown), an actuator port 14 connected to an actuator (not shown), and a tank port 15 which also is connected to the hydraulic fluid tank. The return port 12, pump port 13 and actuator port 14 are formed in the large-diameter passage portion 11a of the spool passage 11 and the tank port 15 is formed in the small-diameter passage portion 11b.

The spool 2 is slidably provided in the spool passage 11. Proceeding from the right to the left, the peripheral surface of the spool 2 is provided with a first land 21 which is normally within the large-diameter passage portion 11a between the return port 12 and the pump port 13, a second land 22 that can be inserted into and retracted from the section of the large-diameter passage portion 11a between the pump port 13 and the actuator port 14, thereby enabling communication between the pump port 13 and the actuator port 14 to be made or broken, a third land 23 which can be inserted into and retracted from the section of the small-diameter passage portion 11b between the actuator port 14 and the tank port 15, thereby enabling communication between the actuator port 14 and the tank port 15 to be made or broken, and a fourth land 24 which is normally located at the left end of the small-diameter passage portion 11b. These are arranged so that the entry of the second land 22 into the large-diameter passage portion 11a coincides substantially with the withdrawal of the third land 23 from the small-diameter passage portion 11b, and the withdrawal of the second land 22 from the large-diameter passage portion 11a coincides substantially with the entry of the third land 23 into the small-diameter passage portion 11b.

A cross-aperture 25 starts from the part of the spool periphery facing the pump port and extends in a direction of intersection with the axis of the spool 2. In the right-hand end of the spool 2 is a horizontal opening 26. The interior of this opening 26, which is arranged along the axis of the spool 2, constitutes the pilot chamber P. The horizontal opening 26 extends to a point where the floor of the opening 26 is adjacent to the cross-aperture 25. Between the floor of the horizontal opening 26 and the inner surface of the cross-aperture 25 is an orifice 27 which extends along the axis of the spool 2. This arrangement therefore provides a path of communication that runs from the cross-aperture 25 through the orifice 27 to the pilot chamber P.

Therefore, hydraulic fluid delivered via the pump port 13 can be introduced into the pilot chamber P via the cross-aperture 25 and the orifice 27. A filter 4 is provided in the cross-aperture 25 to prevent particles of foreign matter in the fluid entering and blocking the orifice 27.

As shown in FIGS. 3 to 6, the filter 4 is constituted by a filter body 41 and a filter element 45. The filter body 41 is cylindrical in shape and has substantially the same diameter as that of the cross-aperture 25. Formed on the top edge of the body are two tapered portions 42 which taper inward and are located diametrically opposite to each other. Two small-diameter portions 43 are provided on the lower edge of the filter body 41, and a recess 44 extending from the outer surface to the inner surface is formed in each of the small-diameter portions 43. The recesses 44 are located so that they are diametrically opposite to each other and offset by 90 degrees from the tapered portions 42. The filter element 45 consists of a flat disk-shaped piece of nylon mesh and is attached to the inner surface of the filter body 41 by adhesive or the like.

When each filter 4 thus constituted is to be inserted into the cross-aperture 25, an arrangement is used in which the small-diameter portions 43 are in mutual abutment and the recesses 44 are in mutual opposition. Thus, the filters are inserted so that a hole formed by the recesses 44 is in opposition to the orifice 27. A retainer pin 5 is provided at one side of the spool 2. In the cross-aperture 25 the filters 4 are held in place by the pin 5, the ends of which clamp and hold the filters together by locking into the tapered portions 42, which also serves to prevent peripheral rotation.

A pressure plate 6 is affixed to the peripheral surface of the spool 2 at a position adjacent to the second land 22 on the actuator port side. The pressure plate 6 is useful when the solenoid proportional control valve is being used to operate a clutch. As this is described in detail in the present inventor's Japanese Unexamined Patent (Utility Model) Publication No. 1(1990)-154378 and does not form part of the gist of the present invention, no further details are included here.

The pilot valve 3 will now be described. A valve seat member 31 is inserted into the right-hand end of the spool passage 11, where it is fixed in position. The left-hand end of the valve seat member 31 is normally located in the horizontal opening 26 in the spool 2, from which it is separated by a small space. Formed in the center of the right-hand end and extending along the axis of the valve seat member 31 is a guide passage 31a, and a valve aperture 31b is formed in the center of the floor of the guide passage 31a. The valve aperture 31b communicates with the pilot chamber P via a small aperture 31c which functions as an orifice. In addition, the guide passage 31a is connected to the return port 12 by a communicating passage 31d.

A valve element 32 is slidably provided in the guide passage 31a. The purpose of the valve element 32 is to open and close the valve aperture 31b. To close the valve aperture 31b, the valve element 32 is moved so that it butts against a flat valve seat 31e formed in the floor of the guide passage 31a. Conversely, opening of the valve aperture 31b is effected by allowing the force of a spring 33 to urge the valve element 32 away from the valve seat 31e.

When the valve aperture 31b is open, hydraulic fluid that has entered the pilot chamber P from the pump port 13 is able to flow via the small aperture 31c, valve aperture 31b, guide passage 31a and communicating passage 31d out through the return port 12 and back to the hydraulic fluid tank, so virtually no pressure is produced in the pilot chamber P. Closing or nearly closing the valve aperture 31b with the valve element 32 causes a pressure to be produced in the pilot chamber P which corresponds to the degree to which the valve apertue 31b is open. This pressure causes the spool 2 to be moved to the left against the resistance of a spring 7.

A casing 34 is attached to the right-hand end of the valve housing 1. Provided inside the casing 34 are a solenoid 35 and an armature 37 which acts through a spring 36 to urge the valve element 32 to the left with a force that corresponds to the strength of the energizing current applied to the solenoid 35.

In the solenoid proportional control valve thus configured, when the solenoid 35 is energized the spring 33 urges the valve element 32 to the right until it comes into contact with the casing 34, opening the valve aperture 31b. This allows hydraulic fluid which has entered the pilot chamber P to flow back to the hydraulic fluid tank via the small aperture 31c, valve aperture 31b, guide passage 31a, communicating passage 31d and return port 12, so virtually no pressure is produced in the pilot chamber P and the spool 2 against the valve seat member 31 by the spring 7. In this state the second land 22 is interposed between the pump port 13 and the actuator port 14, preventing any flow of fluid between these ports.

Energizing the solenoid 35 causes the armature 37 to move to the left which, via the spring 36, pushes the valve element 32 to the left against the resistance of the spring 33. The result is that the valve aperture 31b is closed by the valve element 32, causing a rise in pressure in the pilot chamber P. The valve element 32 is gradually forced back by the rise in the pilot chamber P pressure until a pressure is reached which corresponds to the strength of the energizing current applied to the solenoid 35, at which point the valve aperture 31b will be maintained at the corresponding opening.

Generating a pressure in the pilot chamber P causes the spool 2 to move to the left against the resistnce of the spring 7 and thereby allows fluid from the pump port 13 to flow to the actuator via the actuator port 14. As a result of this flow the pressure in the actuator port 14 rises. This rise in pressure continues until a pressure is reached which corresponds to the strength of the energizing current applied to the solenoid 35, at which point the spool 2 is forced back against the resistance of the pressure in the pilot chamber P by a pressure which is a product of the differential between the pressure-bearing areas of the second land 22 and the third land 23. This causes the access between the pump port 13 and the actuator port 14 to be cut off by the second land 22, thereby enabling the actuator port 14 pressure to be maintained at a prescribed level.

The filter 4 is provided in the cross-aperture 25 of the above solenoid proportional control valve. By preventing particles of foreign matter cotnained in the fluid from entering and blocking the orifice 27, this filter arrangement helps to keep the valve in good working order. Also, since the cross-aperture 25 is provided at a point on the spool axis that is adjacent to the pilot chamber P, the diameter of the cross-opening 25 can be increased without reducing the thickness of the outer wall of the pilot chamber and without, therefore, degrading the strength of the spool. Moreover, the ability to increase the diameter of the cross-opening 25 makes it possible to use a larger filter which will not have to be cleaned or replaced so often, thus providing an effective reduction in maintenance requirements.

The present invention is not of course limited to the embodiment described above. Within the scope of the invention changes and modifications may be made as required. For example, the cross-aperture 25 may be formed so that it only goes part of the way through the spool instead of all the way through as described in the first enbodiment, in which case only one filter 4 would be provided. The invention can also be applied to solenoid proportional flow control valves.

In the solenoid proportional control valve according to the first embodiment, a cross-aperture is formed in the spool at a position on the spool axis adjacent to the pilot chamber, an orifice that extends along the spool axis is formed between the cross-aperture and the pilot chamber and the cross-aperture is provided with a filter to remove particles of foreign matter contained in the hydraulic fluid, an arrangement which reliably protects the orifice against blockage without increasing the maintenance requirements or degrading the strength of the spool.

Figure 11:
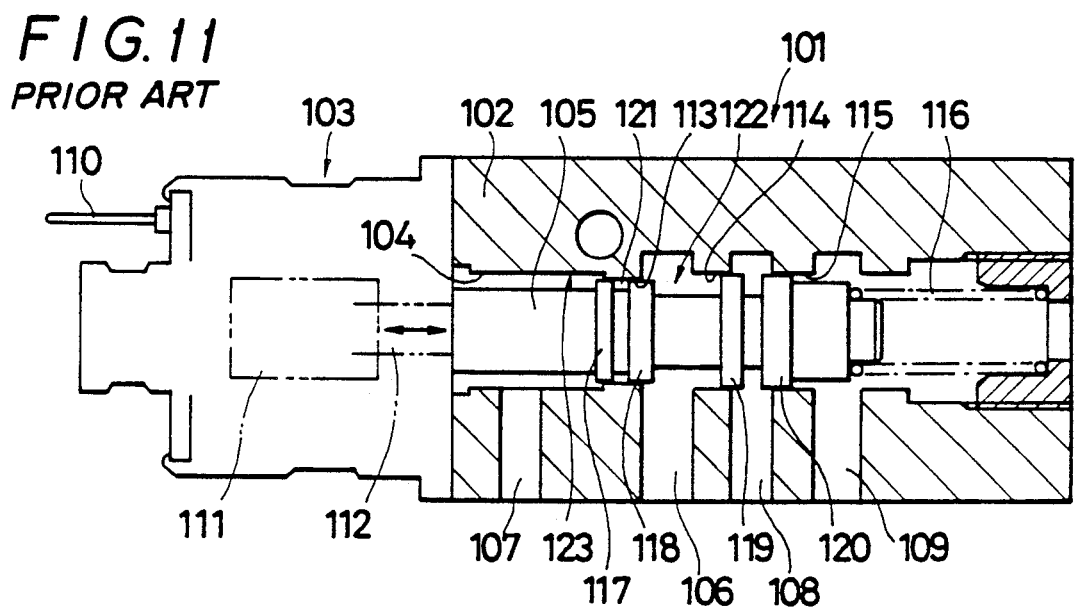
FIG. 11 is also a sectional view of a conventional solenoid proportional control valve.
Figure 12:
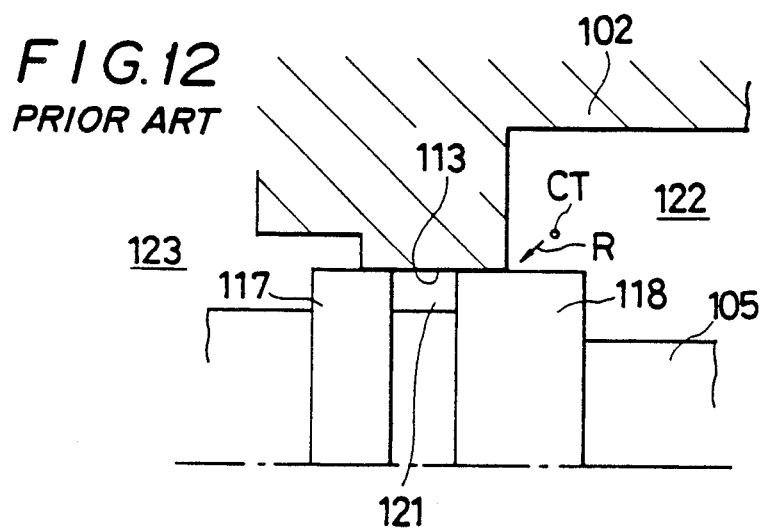
FIG. 12 is an enlarged sectional view of the principal parts of the conventional valve.

A second embodiment will now be described with reference to FIGS. 7 and 8. Parts which are the same as those described with reference to FIGS. 11 and 12 have been given the same reference numerals, and further details of these parts are omitted.

Figure 7:
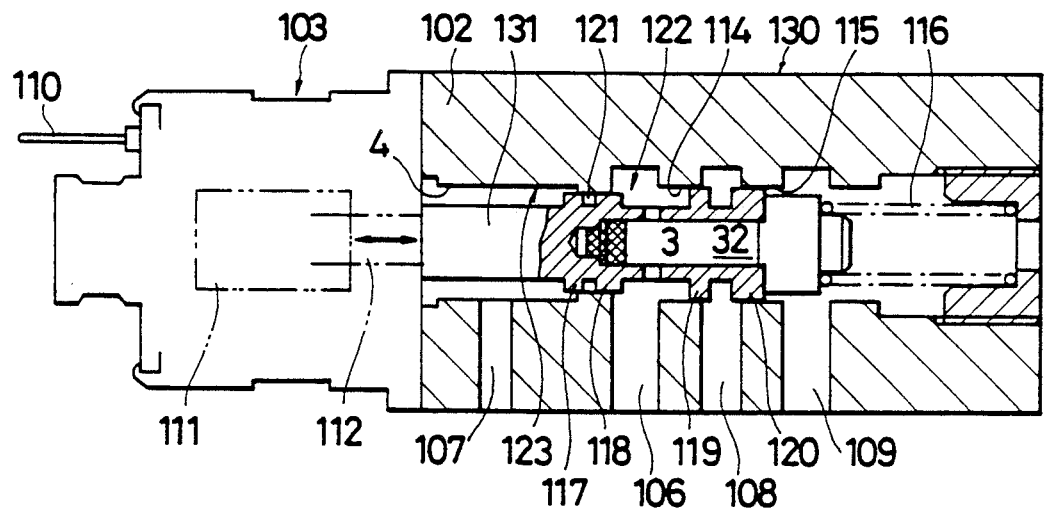
FIG. 7 is a sectional view of a solenoid proportional control valve according to a second embodiment of the invention.
Figure 8:
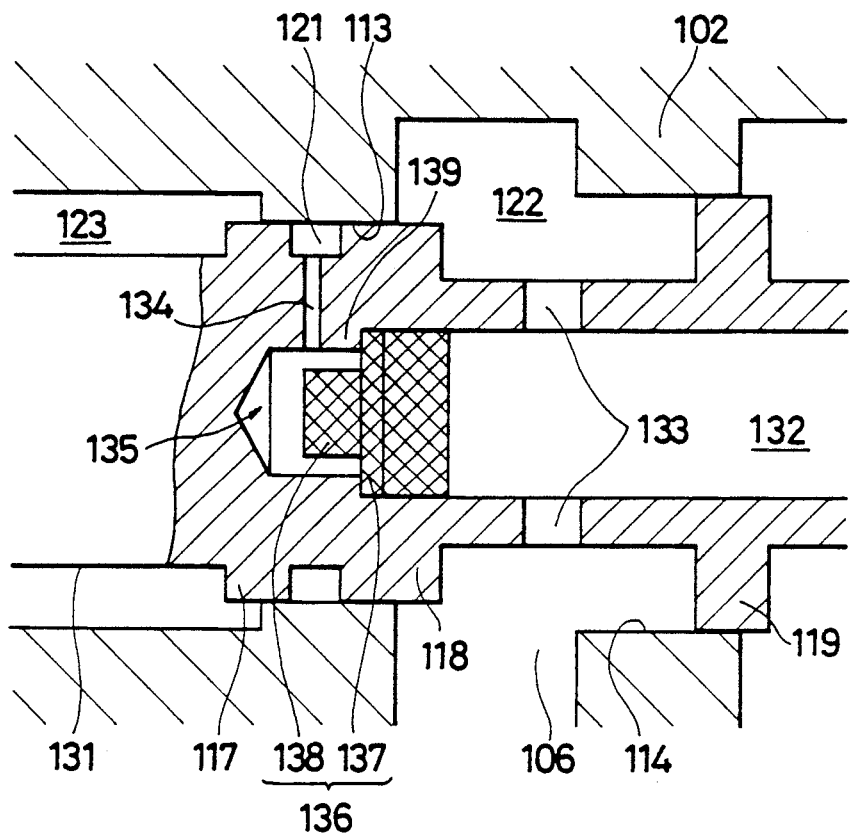
FIG. 8 is an enlarged sectional view of the principal parts of the embodiment.

FIG. 7 is a sectional view of a solenoid proportional control valve 130 and FIG. 8 shows an enlarged sectional view of the principal parts. A spool 131 corresponding to the above spool 105 is disposed in a central passage 132. The central passage 132 and a delivery port 106 are linked by a first communicating passage 133 and a second communicating passage 134 connects the central passage 132 to the hydraulic pressure balance groove 121. A communicating passage 135 connects the delivery passage 106 to a high-pressure chamber 122 and the hydraulic pressure balance groove 121.

A filter 136 is provided in the central passage 132 between the first communicating passage 133 and the second communicating passage 134 to remove particles of foreign matter CT. The filter 136 has an engagement portion 137 and a box portion 138 and is fixed in the passage 132 by the engagement of the engagement portion 137 with a stepped engaging portion 139 in the passage 132.

In the solenoid proportional control valve thus configured, the delivery port 106 and the hydraulic fluid pressure balance groove 121 are connected by the communicating passage 135, i.e. the first communicating passage 133, the central passage 132 and second communicating passage 134 and the hydraulic pressure balance groove 121 can be maintained at the same pressure as the delivery port 106, forming a state in which there is no flow of hydraulic fluid between the hydraulic pressure balance groove 121 and the delivery port 106 and high-pressure chamber 122 which is at the same pressure.

As any particles of foreign matter CT which get into the passage 132 and the high-pressure chamber 122 can be removed by the filter 136, the high-pressure chamber 122, passage 132 and pressure balance groove 121 as well as the low-presure chamber 123 which is at a lower pressure than the pressure balance groove 121 can be protected from contamination by such particles of foreign matter CT.

Hydraulic fluid can be delivered to the hydraulic pressure balance groove 121 at a higher pressure than in a conventional arrangement and the pressure balance groove 121 can therefore exert a correspondingly higher peripheral pressure on the spool 131, enhancing the groove's function of preventing axial deviation of the spool 131.

Figure 9:
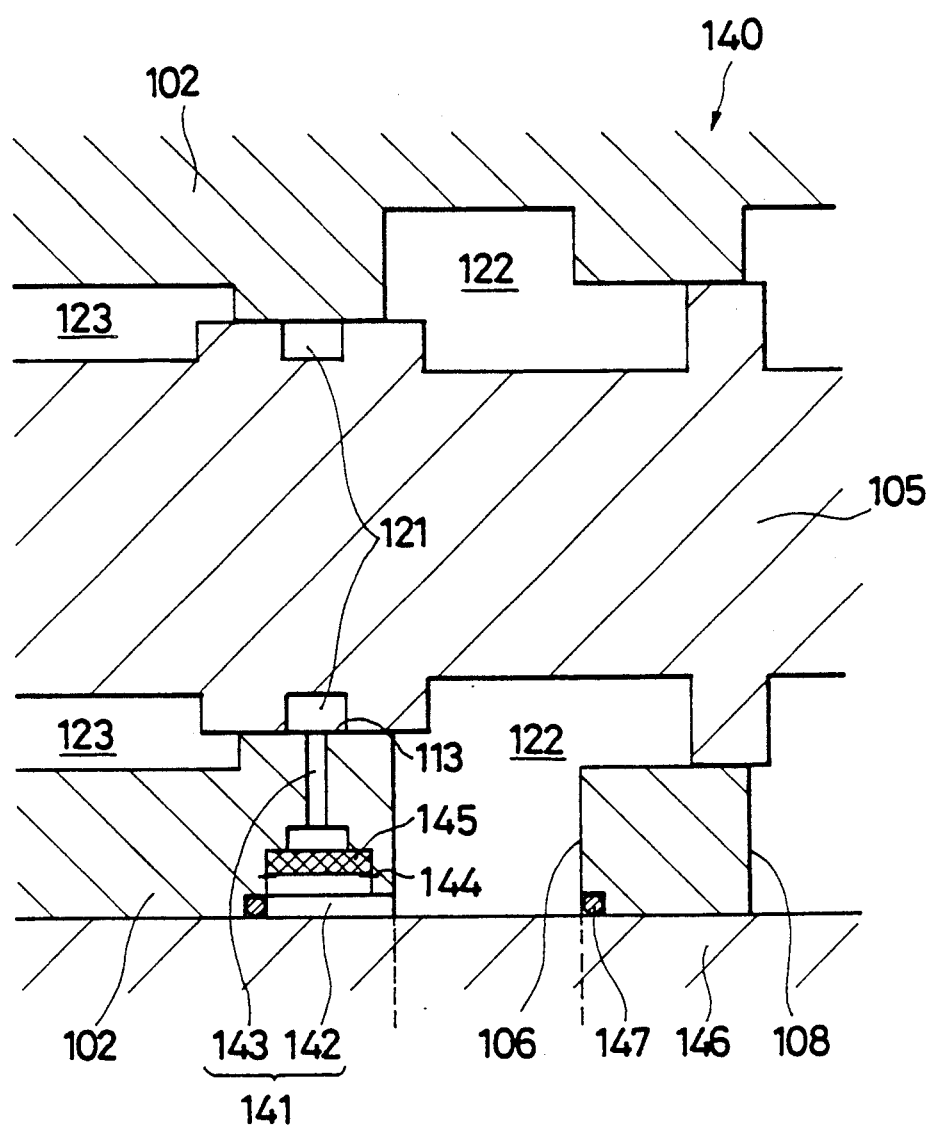
FIG. 9 is an enlarged sectional view of the principal parts of a solenoid proportional control valve according to a third embodiment.
Figure 10:
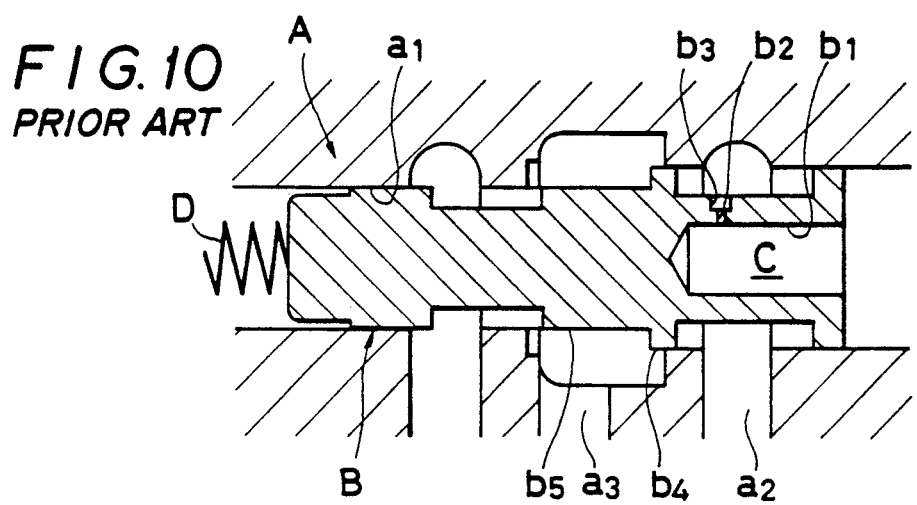
FIG. 10 is a sectional view of part of a conventional solenoid proportional control valve.

The configuration of the communicating passages is arbitrary. An arrangement may be used such as the one in FIG. 9, for example, which shows an enlarged view of the main parts of a solenoid proportional control valve 140 according to a third embodiment. Here, the spool 105 is not hollow and a communicating passage corresponding to the above passge 135 is formed in the valve housing 102 itself.

More specifically, the above first and second communicating passages 142 and 143 which communicate with the delivery port 106 and high-pressure chamber 122 are formed in the valve housing 102, and the above communicating passage 141 is constituted by these first and second passages 142 and 143. A snap-ring 144 is used to affix a filter 145 in the first communicating passage 142. An O-ring 147 is interposed between the housing 102 and the plate 146.

In the solenoid proportional control valve 140 configured thus, the pressure equalization and dirt particle removal functions are the same as those in the above-described solenoid proportional control valve 130, and further details thereof are therefore omitted here.

This invention has been described with particular referenc to a solenoid proportional control valve, a type of valve in which it is especially desirable to prevent the entry of foreign particles, but it is of course equally applicable to spool control valves in general.

In the second and third embodiments the pressure balance groove is communicated with the high-pressure chamber and the filter is provided in this communicating passage, thereby enhancing the contamination-resistance of the valve and reinforcing the function of the pressure balance groove.

Thus, as described above, in accordance with the present invention a filter is located in the spool, enabling particles of foreign matter contained in the hydraulic fluid to be efficiently captured before they can cause a blockage in the valve.

What is claimed is:

1. A spool control valve comprising:
   a valve housing in which are formed a spool passage and a multiplicity of hydraulic fluid ports in communication with the spool passage;
   a spool slidably arranged in the spool passage in the valve housing;
   drive means for driving the spool to open and close the hydraulic fluid ports;
   wherein communicating passages are formed in the spool which communicate between a first location and a second location in the spool passage, the first location in the spool passage being a portion in communication with a pump port, the second location being a portion in communication with a return port;
   wherein the communicating passages in the spool comprise a cross-aperture which extends from the outer peripheral surface facing the pump port in a direction of intersection with the axis of the spool, an orifice which has a smaller cross-section than that of the cross-aperture, and a pilot chamber which is connected to the cross-aperture by the orifice;
   wherein a pair of filter elements is disposed in the cross-aperture with the orifice arranged therebetween, each of the filter elements being inserted into the cross-aperture in a direction of intersection with the axis of the spool.

* * * * *